(12) United States Patent
Gill et al.

(10) Patent No.: US 7,835,761 B2
(45) Date of Patent: Nov. 16, 2010

(54) METHOD FOR DISTINGUISHING DIFFERENT TYPES OF DATA CONTENT IN DATA PACKETS IN A WIRELESS COMMUNICATION SYSTEM

(75) Inventors: Harleen K. Gill, San Diego, CA (US); Ashu Razdan, San Diego, CA (US); Arulmozhi Kasi Ananthanarayanan, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 11/156,179

(22) Filed: Jun. 17, 2005

(65) Prior Publication Data
US 2005/0288050 A1 Dec. 29, 2005

Related U.S. Application Data

(60) Provisional application No. 60/581,790, filed on Jun. 21, 2004, provisional application No. 60/686,131, filed on May 31, 2005.

(51) Int. Cl.
*H04B 7/00* (2006.01)
(52) U.S. Cl. ..................... 455/518; 455/509
(58) Field of Classification Search .......... 455/518, 455/519, 509, 450, 456.2
See application file for complete search history.

(56) References Cited

U.S. PATENT DOCUMENTS

| | | | |
|---|---|---|---|
| 6,751,468 | B1 * | 6/2004 | Heubel et al. ............... 455/518 |
| 2002/0173325 | A1 * | 11/2002 | Rosen et al. ................ 455/518 |
| 2003/0153343 | A1 * | 8/2003 | Crockett et al. ............ 455/519 |
| 2004/0032843 | A1 | 2/2004 | Schaefer et al. ............ 370/338 |
| 2004/0107294 | A1 | 6/2004 | Chen |
| 2004/0187109 | A1 * | 9/2004 | Ross et al. .................. 718/100 |
| 2004/0219940 | A1 * | 11/2004 | Kong et al. ................. 455/518 |
| 2006/0276213 | A1 * | 12/2006 | Gottschalk et al. .......... 455/518 |

FOREIGN PATENT DOCUMENTS

| | | |
|---|---|---|
| JP | 2004526392 | 8/2004 |
| JP | 2005535156 | 11/2005 |
| JP | 2006508617 | 3/2006 |
| WO | WO03069928 | 8/2003 |

OTHER PUBLICATIONS

International Search Report and Written Opinion - PCT/US2005/022025, International Search Authority - European Patent Office, Oct. 13, 2005.

* cited by examiner

*Primary Examiner*—Tu X Nguyen
(74) *Attorney, Agent, or Firm*—Raphael Freiwirth

(57) ABSTRACT

Apparatus and method for reducing latency in push-to-talk communications in a wireless communication network. Time sensitive push-to-talk (PTT) related messages are identified in a specially designated header, so they can be handled differently by radio mobile devices. These messages with the special designated header are transmitted through signaling channels from a radio transmission unit to a mobile device, as opposed to being transmitted as dedicated channel traffic.

18 Claims, 4 Drawing Sheets

METHOD FOR DISTINGUISHING DIFFERENT TYPES OF DATA CONTENT IN DATA PACKETS IN A WIRELESS COMMUNICATION SYSTEM

CROSS-REFERENCE TO RELATED APPLICATIONS

This application claims the benefit of U.S. Provisional Patent Application Ser. No. 60/581,790, filed on Jun. 21, 2004; and U.S. Provisional Patent Application Ser. No. 60/686,131, filed on May 31, 2005. The contents of these documents are incorporated herein by reference.

BACKGROUND OF THE INVENTION

1. Field of the Invention

The invention relates to data transfer in a wireless telecommunication system and, more particularly, the identification of data types transferred within the data packets of a wireless telecommunication system.

2. Description of the Related Art

In wireless telecommunication systems, Push-to-talk (PTT) capabilities are becoming popular with service sectors. PTT can support a "dispatch" voice service that operates over standard commercial wireless infrastructures, such as code division multiple access (CDMA), frequency division multiple access (FDMA), time division multiple access (TDMA), and global system for mobile communications (GSM). In a dispatch model, communication between endpoints (end user devices) occurs within virtual groups, wherein the voice of one "talker" is broadcast to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification. In the absence of a wireless multicast channel, each group is formed by the combination of separate point-to-point connections between each endpoint and application servers manage the call. Each endpoint is also known as a client.

FIG. 1 illustrates a prior art architecture 100 supporting PTT communications. The architecture includes the deployment of a single application server region in conjunction with a carrier's CDMA infrastructure and packet data network. Each region of the application servers is deployed over a specific portion of a carrier packet data network. The application server within the region may be routing traffic between one or more Packet Data Service Nodes (PDSNs) in the carrier network. A communication device 102 that supports the PTT feature is in communication with a base station 104. The base station 104 is in communication with a high speed network 106 and PTT communications received from the communication device 102 is sent through the base station 104 and the network 106 to a packet data service node (PDSN). The PDSN communicates with the high speed network 106 and an application server's network 108, which is connected to a PTT network 110. The PDSN forwards the PTT communications to an application server 112 in the PTT network 110.

The application server 112 receives a PTT communication from one member and forwards it to all members of the PTT group. The PTT communication is usually received as data packets from the network 110, and the PTT communication sent out by the application server 112 are also in data packet format. A receiving mobile switching center (MSC) and a connected base station (BS) then established a dedicated channel to transmit the PTT communication to a receiving mobile client (a PTT member).

FIG. 2 illustrates a prior art message flow 200 for a PTT call set up. When a PTT user (originator) is ready to make a PTT communication, he presses a PTT activation button on his mobile device 102 and a PTT request is thus made. In response to the PTT request received by the mobile device 102, and the mobile device sends a call request message to the application server 112, which is also known as the PTT dispatcher. The application server 112 receives and processes the call request message. The call request processing includes identifying the PTT user, identifying a PTT group to which the PTT user belongs, identifying member of this PTT group, and preparing announce call messages to be sent to each member of the PTT group.

After the application server 112 sends the announce call messages, each announce call message is received by a MSC and forwarded by the MSC to a BS. The BS broadcasts the announce call message. If a mobile client who is a targeted receiver is available, the mobile client sends an accept call message back to the application server 112. After receiving the accept call message from at least one mobile client, the application server 112 sends a floor grant message back to the originating mobile client. There may be more than one targeted user in the originator's PTT communication group, and the application server 112 will grant the floor to the originator if there is at least one targeted mobile client available. After receiving the floor grant message, the PTT requesting mobile client (originator) can then make a PTT communication. The PTT related messages described above are transmitted as data packets, preferably as Internet Protocol (IP) data packets. Other data formats can also be used to transfer these PTT related messages.

The PTT communication set up process described above is time sensitive and the initial PTT latency shown in FIG. 2 is affected by network traffic. The long latency directly affects users of the PTT communication. Therefore, it is desirous to have a system and method for reducing the PTT latency and it is to such system and method this invention is primarily directed.

SUMMARY OF THE INVENTION

The apparatus and method of the invention enables fast response to PTT related inputs from a PTT communication user. In one embodiment, there is provided a method for reducing latency in a push-to-talk (PTT) communication between a plurality of mobile devices, wherein each mobile device communicates with a wireless communication network through signaling channels and data channels. The method includes receiving at radio signal transmission point a data packet containing a PTT message from a data communication network, wherein the data packet having a header, checking the header of the data packet, and, if the header of the data packet has a predetermined value, transmitting the PTT message to a mobile device through a signaling channel, as opposed for waiting for a dedicated access channel to be bridged.

In another embodiment, there is provided an apparatus for reducing latency in a push-to-talk (PTT) communication between a plurality of mobile devices, with each mobile device communicating with a wireless communication network through signaling channels and data channels. The apparatus includes a network interface unit for receiving data packets from a data network, each data packet having a header and containing a PTT related message, a storage unit for storing a data packet, wherein the data packet having a header, a controller unit for analyzing the header of the stored data packet, and a radio interface unit for transmitting the stored data packet via radio signal to a mobile device, wherein, if the header of the stored data packet has a predetermined value, transmitting the stored data packet to the mobile device through a signaling channel.

The present apparatus and methods are therefore advantageous as they reduce latency in a PTT communication between a plurality of users through use of the constantly established signaling channels, as opposed to periodically established dedicated communication channels. Other advantages and features of the present invention will become apparent after review of the hereinafter set forth Brief Description of the Drawings, Detailed Description of the Invention, and the claims.

DETAIL DESCRIPTION OF THE INVENTION

Figure 1:
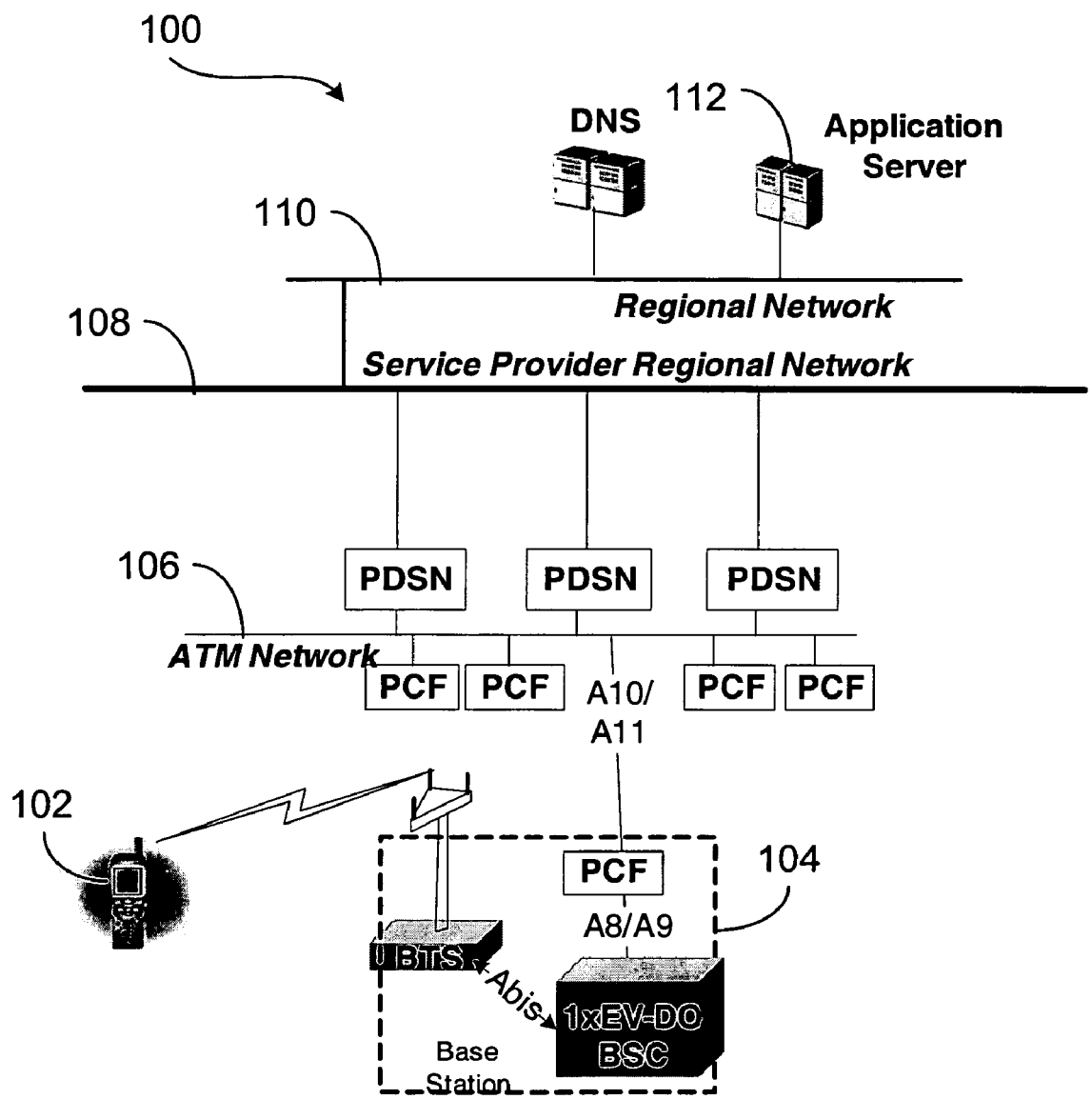
FIG. 1 is a prior art architecture of a wireless communication network.

In this description, the terms "communication device," "wireless device," "wireless communications device," "PTT communication device," "handheld device," "mobile device, and "handset" are used interchangeably. The term "application" as used herein is intended to encompass executable and nonexecutable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

In overview, the system and methods of the invention reduce latency delay for push-to-talk (PTT) communications between a wireless device and a wireless communication network. Normally, when a wireless device is ready to transmit a PTT communication to a base station (BS), the wireless device sends a channel request to the BS through a signaling channel. The BS will establish a reverse access channel and the wireless device will then transmit the PTT communication over the reverse access channel to the BS. Similarly, when the BS is ready to transmit a PTT communication to the wireless device, the BS broadcasts a paging message through the signaling channel. After the wireless device acknowledges the paging message, the BS establishes a forward access channel to the wireless device and transmits the PTT communication through the forward access channel to the wireless device. The channel request and other PTT call set up messages shown in FIG. 2, as well as PTT communications, are transmitted as data packets through the wireless communication network and the data communication network.

However, PTT communication is not the only service provided to users of a wireless device, other services, such as electronic mails, Internet web browsing, short message services (SMS), etc., are also available to the users. The application server 112 handles not only PTT communications among members of PTT groups but also the other services provided to wireless devices. The data related to all these services are also transmitted as data packets between the application server 112 and the wireless devices 102. These data packets also are processed by the application server 112 and the base stations 104 just like any other data packets. The additional data packets increase the traffic and slow down the wireless communication network.

Since the data packets in the wireless communication network support different types of services, they contain data for different types of services and can be identified by the data packet's header. According to one embodiment of the invention, the data packets can be broadly classified in three categories according to their contents: PTT call set up related messages, PTT communication messages, and other service related messages. The PTT call set up related messages are most time sensitive since it is perceptible to a PTT user. The PTT communication messages are also time sensitive since delay can cause jitters in a PTT communication. Other general services related messages include voice communications, electronic mail messages, web browsing messages, and short message services. These non-PTT related messages are less time sensitive. The above cited services are only examples of services and those skilled in the art would appreciate services not listed above may also be classified in term of time sensitivity.

Figure 3:
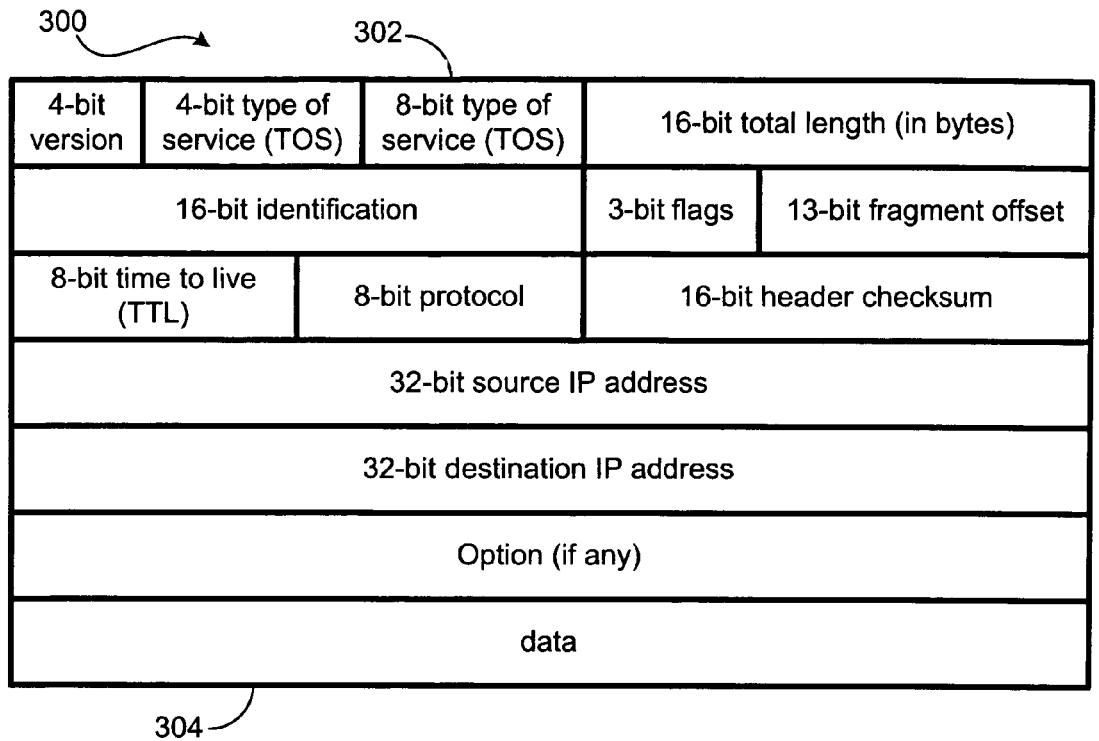
FIG. 3 is an exemplary embodiment of a header of a data packet.
Figure 4:
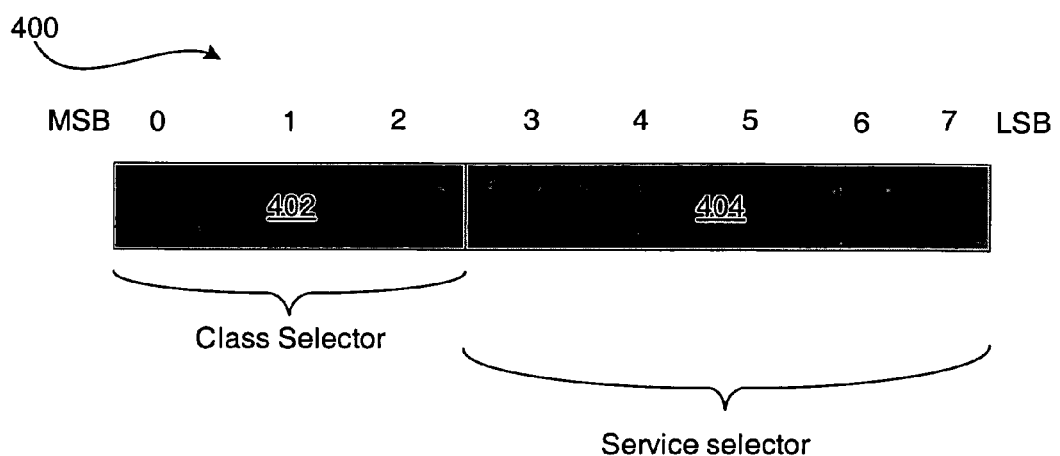
FIG. 4 is an exemplary embodiment of a type of service field in a header of a data packet.

FIG. 3 illustrates a packet header 300 according to one embodiment of the invention. There is a plurality of fields, each field labeled for a specific function. An 8-bit field, type of service (TOS), 302 indicates the type of service for the data in the data field 304. FIG. 4 is an illustration 400 of one embodiment of the 8-bit TOS field, where the 8-bit TOS field 302 is divided into two sub-fields: class selector 402 and service selector 404. The class selector 402 can be use to identify the class to which the data 304 belongs. For example, the data may be a PTT set up message and thus belonging to a time sensitive class; alternatively, the data may be part of a PTT communication, thus belonging to a class that is a little less time sensitive compared with a PTT set up message. The service selector 404 can be used to identify the service to which the data 304 belongs. For example, the data may be a PTT call accept message. It is understood that people skilled in the art may devise or use different fields in a data packet header to represent same information.

The data packets may be generated by a wireless device when it communicates with an application server 112. The wireless device generates a data packet for a particular service it is handling and sets the TOS field to reflect the service. The wireless device can check the TOS field and decide whether to request a dedicated channel to send the data packet to a base station 104. Alternatively, the wireless device may already know about the type of the data it is handling and then use the information to decide whether to send the data file through a signaling channel to the base station 104. After the base station 104 receives the information, it forwards the data packet to the application server 112 for processing.

The application server 112 may also generate data packets and sets the TOS field of the message according to the type of the service to which the data relates. For example, the application server 112 may receive a call accept message in a data packet from a wireless device, and then generates a floor grant message to be sent to a PTT originating user. The floor grant message will be sent in a data packet to a base station 104 serving the PTT originating user. The base station 104 receives the data packet and checks its TOS field. The base station 104 realizes it is a time sensitive message and then transmits the floor grant message through a signaling channel to the wireless device of the PTT originating user. If the data packet contains a website related data, which is not a time sensitive message, the base station 104 then request a dedicated channel to be set up between itself and the wireless device. The website related data will then be sent through the dedicated channel.

Figure 5:
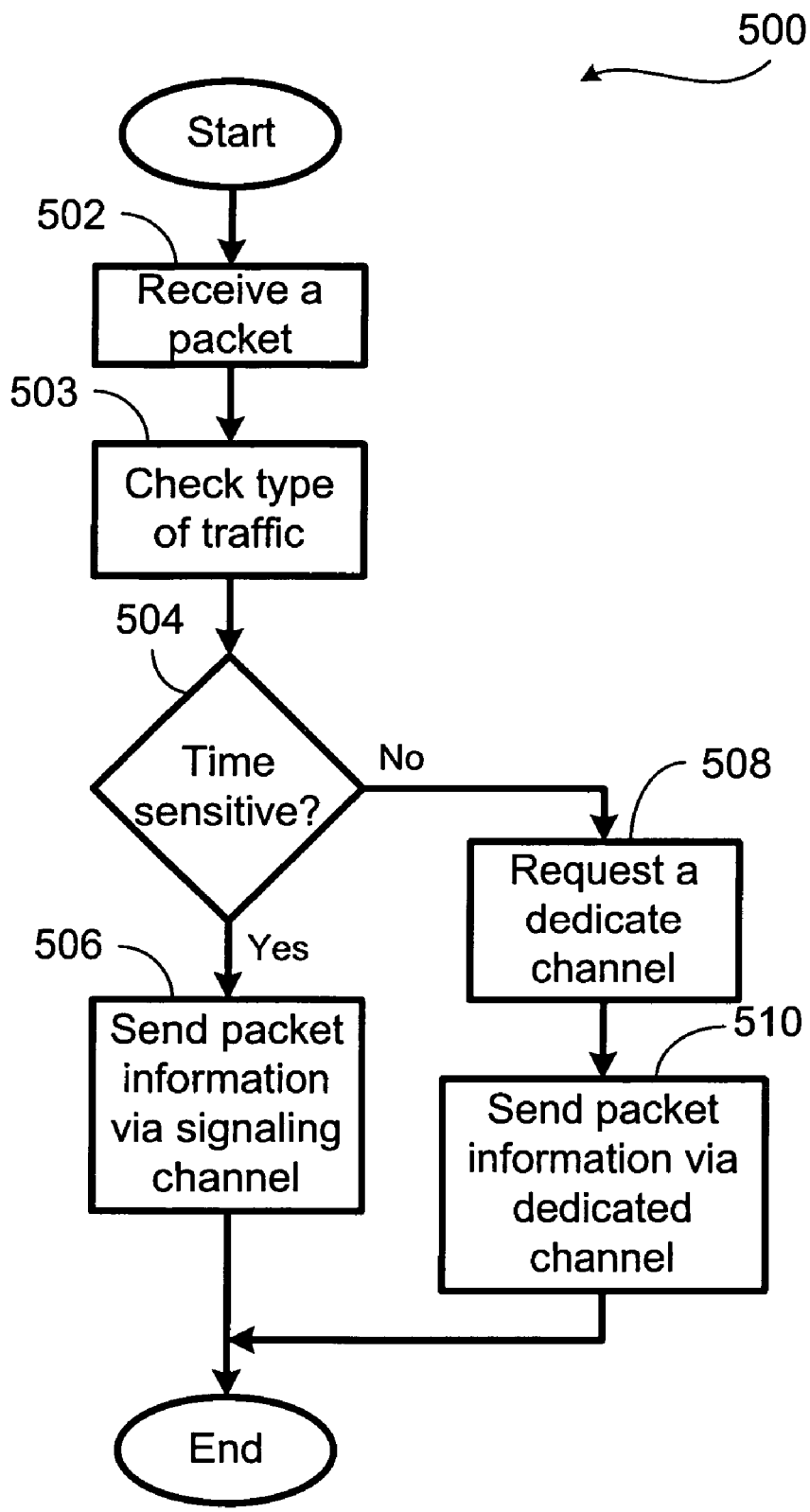
FIG. 5 is a flow chart of an exemplary embodiment of a base station process.

FIG. 5 is a flow chart 500 for a process handling incoming data packets at a base station 104. When the base station 104 receives a data packet, step 502, it checks the data packet's header, step 504. If the TOS field in the packet header is marked as time sensitive, the base station 104 transmits the data packet's information through the signaling channel, step 506. If the TOS field in the packet's header is not marked as time sensitive, then the base station 104 will establish a dedicated channel, step 508, and sends the data packet via the dedicated channel to the targeted wireless device, step 510.

The following is a use scenario illustrating the invention. When a first user is accessing electronic mails through his wireless device, the user may send a reply mail to a second user. The wireless device packs the reply mail in a data packet and marks the TOS field of the data packet as non-time-sensitive electronic mail service. The wireless device then requests a reverse channel and sends the data packet over this reverse channel to the base station 104. The base station 104 receives the data packet and forwards the data packet to its destination, an application server 112, according to the data packet's header.

The application server 112 receives the data packet and realizes it is a reply email to the second user. The application server 112 then forwards the data packet to a base station 104 serving the second user. The base station 104 receives the data packet, checks its TOS field, and requests a dedicated access channel. After a forward access channel is set up, the base station 104 sends the data packet through the forward access channel to the second user's wireless device.

After the second user reads the reply email, he decides to communicate with the first user through the push-to-talk feature. The second user activates the PTT button on his wireless device and the wireless device generates a data packet with a call request message to the application server 112. The wireless device transmits the data packet with the call request message through a signaling channel to the base station 104 because the wireless device recognizes the data packet as containing a time sensitive message. The base station 104 receives the data packet and forwards it to the application server 112.

The application server 112 checks the data packet and realizes it contains a call request message. The application server 112 then checks whether the PTT communication group to which the first and second users belong is being used. If another user has the floor for the PTT communication group, the call request will be rejected. If the floor of the PTT communication group is available, the application server 112 identifies members of the PTT communication group, generates a data packet with a call announce message, and broadcasts the data packet to all members of the PTT communication group.

Figure 2:
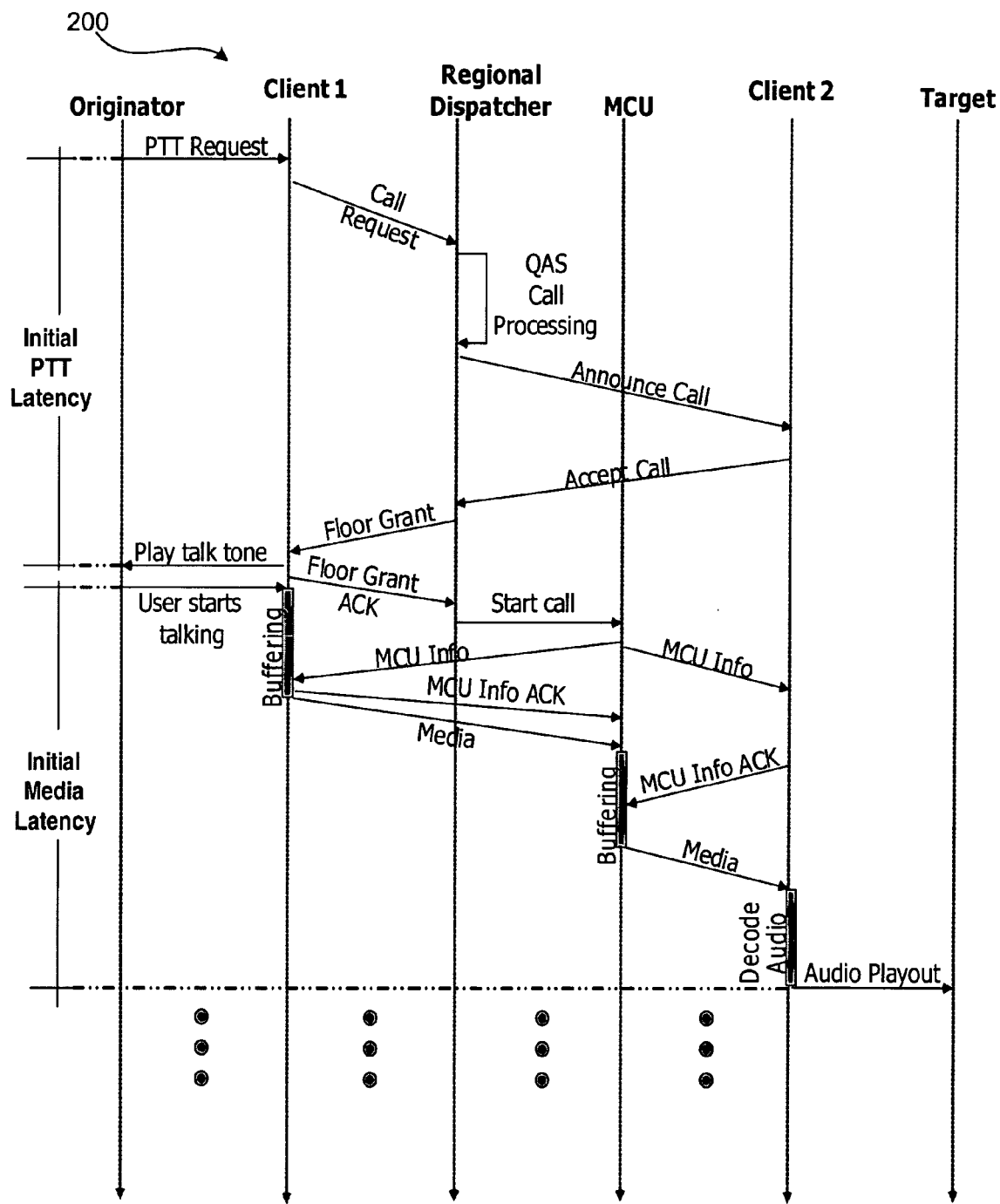
FIG. 2 is a prior art message flow for setting up a PTT call.

The data packet with the call announce message is received by the base station 104 serving the first user and the base station 104 checks the TOS field of the data packet's header. The base station 104 realizes the data packet contains a time sensitive message and sends the data packet over a signaling channel to the first user's wireless device. If the wireless device is available, it sends back a call accept message as illustrated in FIG. 2. Other steps of FIG. 2 are similarly executed and the data packets supporting these steps are transmitted over a signaling channel or a dedicated channel depending the type of the message, which is identified by the TOS field.

By transmitting time sensitive messages through a signaling channel instead of requesting and waiting for a dedicated access channel be set up, latency in PTT communications can be reduced and thus making use of the PTT feature more pleasant to users.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIG. 5, the method may be implemented, for example, by operating portion(s) of the wireless network, such as a wireless communications device or the server, to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, it is understood the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method for reducing latency in a push-to-talk (PTT) communication between a plurality of mobile devices, each mobile device communicating with a wireless communication network through at least one signaling channel and data channels, comprising the steps for:

receiving at a radio signal transmission point a data packet containing a PTT message from a data communication network, the data packet having a header;

checking the header of the data packet to determine whether the header contains a predetermined value that indicates that the PTT message is a time-sensitive PTT message; and transmitting the PTT message to a mobile device through a signaling channel if the predetermined value indicates that the PTT message is a time-sensitive PTT message.

2. The method of claim 1, further comprising the step for, if the header in the data packet does not have the predetermined value, requesting a dedicated access channel to be set up between the radio signal transmission point and the mobile station and transmitting the PTT message to the mobile device through the dedicated access channel.

3. The method of claim 1, wherein the step for checking the header of the data packet further includes the step for checking a predetermined field in the header.

4. The method of claim 1, further comprising the step for embedding the PTT message in a signaling message.

5. An apparatus for reducing latency in a push-to-talk (PTT) communication between a plurality of mobile devices, each mobile device communicating with a wireless communication network through signaling channels and data channels, comprising:
- a network interface unit for receiving data packets from a data network, each data packet having a header and containing a PTT related message;
- a storage unit for storing a data packet, the data packet having a header;
- a controller unit for analyzing the header of the stored data packet; and
- a radio interface unit for transmitting the stored data packet via radio signal to a mobile device,
- wherein, if the header of the stored data packet has a predetermined value that indicates that the PTT related message is a time-sensitive PTT message, transmitting the stored data packet to the mobile device through a signaling channel.

6. The apparatus of claim 5, wherein, if the header of the stored data packet does not have the predetermined value, transmitting the stored data packet to the mobile device through a dedicated access channel.

7. The apparatus of claim 5, wherein the controller further being capable of checking a predetermined field in the header.

8. The apparatus of claim 5, wherein the radio interface unit embeds the PTT message in a signaling message.

9. An apparatus for reducing latency in a push-to-talk (PTT) communication between a plurality of mobile devices, each mobile device communicating with a wireless communication network through signaling channels and data channels, comprising:
- means for receiving data packets from a data network, each data packet having a header and containing a PTT related message;
- means for storing a data packet, the data packet having a header;
- means for analyzing the header of the stored data packet; and
- means for transmitting the stored data packet via radio signal to a mobile device,
- wherein, if the header of the stored data packet has a predetermined value that indicates that the PTT related message is a time-sensitive PTT message, transmitting the stored data packet to the mobile device through a signaling channel.

10. The apparatus of claim 9, wherein, if the header of the stored data packet does not have the predetermined value, transmitting the stored data packet to the mobile device through a dedicated access channel.

11. The apparatus of claim 9, wherein the means for analyzing the header further being capable of checking a predetermined field in the header.

12. The apparatus of claim 9, wherein the means for transmitting the stored data packets further being capable of embedding the PTT message in a signaling message.

13. A computer program on a computer-readable medium for reducing latency in a push-to-talk (PTT) communication between a plurality of mobile devices, each mobile device communicating with a wireless communication network through signaling channels and data channels, the computer program comprising computer instructions that when executed by a communication server performs the steps of:
- receiving at radio signal transmission point a data packet containing a PTT message from a data communication network, the data packet having a header;
- checking the header of the data packet to determine whether the header contains a predetermined value that indicates that the PTT message is a time-sensitive PTT message; and
- transmitting the PTT message to a mobile device through a signaling channel if the predetermined value indicates that the PTT message is a time-sensitive PTT message.

14. The computer program of claim 13, further performing the step for, if the header in the data packet does not have the predetermined value, requesting a dedicated access channel to be set up between the radio signal transmission point and the mobile station and transmitting the PTT message to the mobile device through the dedicated access channel.

15. The computer program of claim 13, wherein the predetermined value indicates the PTT message is a time sensitive PTT message.

16. The computer program of claim 13, wherein the step for checking the header of the data packet further includes the step for checking a predetermined field in the header.

17. The computer program of claim 13, further performing the step for embedding the PTT message in a signaling message.

18. A method for reducing latency in a push-to-talk (PTT) communication between a plurality of mobile devices, each mobile device communicating with a wireless communication network through at least one signaling channel and data channels, comprising the steps for:
- receiving a data packet containing a PTT message from a data communication network;
- selecting, based on information included within a header of the PTT message, between a signaling channel and a dedicated channel for transmission of the data packet on a forward link; and
- transmitting the PTT message to a mobile device through the selected transmission channel.

* * * * *